United States Patent [19]
Ackermann et al.

[11] 3,723,425
[45] Mar. 27, 1973

[54] BRIGHTENERS OF THE BIS-S-TRIAZINYLAMINOSTILBENE SERIES

[75] Inventors: Hans Ackermann, Bottmingen, Baselland; Gerhard Creutzburg, Riehen, both of Switzerland

[73] Assignee: Ciba-Geigy Corporation, Ardsley, N.Y.

[22] Filed: Oct. 13, 1970

[21] Appl. No.: 80,484

[52] U.S. Cl. ............... 260/240 B, 106/124, 106/176, 117/33.5 T, 252/301.2 W, 162/162, 252/543, 260/37 NP, 260/75 R, 260/78 R
[51] Int. Cl. ................................................ C09d 23/00
[58] Field of Search ............. 260/240 B, 249.6, 240.1

[56] References Cited

UNITED STATES PATENTS 3,018,287  1/1962  Fleck .............................. 260/240 B
2,945,762  7/1960  Carroll et al. ..................... 96/100

OTHER PUBLICATIONS

Chemical Abstracts I, vol. 66, abstract no. 555525t (1967)
Chemical Abstracts II, vol. 71, abstract no. 30506c (1969)

Primary Examiner—John D. Randolph
Attorney—Karl F. Jorda and Martin J. Spellman

[57] ABSTRACT

New 4,4'-bis-[4''-cyanamino-s-triazinyl-(2'')-amino]-stilbene-2,2'-disulphonic acids and salts thereof are brighteners for organic materials. They are prepared by reacting a 2,4,6-trichloro-s-triazine with 4,4'-diaminostilbene-2,2'-disulphonic acid, with the alkali metal salt of a cyanamide and optionally with an alcohol, phenol or an amine.

7 Claims, No Drawings

BRIGHTENERS OF THE BIS-S-TRIAZINYLAMINOSTILBENE SERIES

DETAILED DESCRIPTION

The present invention relates to new brighteners of the bis-s-triazinlaminostilbene series which are substituted on the triazinyl rings by cyanamide groups, to the use of these compounds for the optical brightening of organic materials, and to a process for the production of these compounds.

Optical brighteners of the bis-triazinylaminostilbene series having good brightening properties are already known. Many of these compounds have, however, little resistance to acid, or possess poor drawing power from acid baths. Surprisingly, it has now been found that the new brighteners according to the invention are distinguished by a high resistance to acid and good drawing power from acid baths. Since the compounds are water-soluble, they can be applied extremely well and with a good brightening effect to organic substrates, especially to cellulose, and to natural and synthetic polyamide fifers. The compounds according to the invention are constituted by formula I:

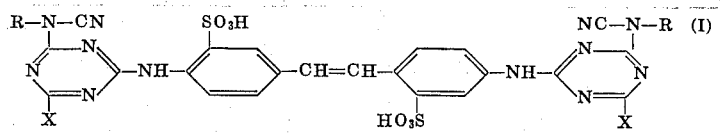

or by the alkali metal salts or alkaline-earth metal salts thereof. The symbols in the formula have the following meanings:

R represents hydrogen, an alkyl group having one to four carbon atoms or a hydroxyalkyl group or aminoalkyl group having two to four carbon atoms, X represents chlorine, the radical bound by way of the oxygen of an alcohol having one to four carbon atoms or phenol, or the radical

in which $R_1$ stands for hydrogen, a lower alkyl having one to four carbon atoms, a hydroxyalkyl group having two to four carbon atoms, an alkoxyalkyl group having three to eight carbon atoms, whereby the oxygen atom and the nitrogen atom are not bounded to the same carbon atom, or a phenyl group optionally substituted by one to two chlorine atoms, alkyl groups having one to four carbon atoms or sulphonic acid groups; $R_2$ stands for hydrogen or an alkyl group having one to four carbon atoms or a hydroxyalkyl group having two to four carbon atoms; or $R_1$ and $R_2$ together represent the radical of a hydroaromatic, heterocyclic radical.

If R denotes hydrogen in formula I, then this hydrogen is split off in aqueous solution as a cation. From alkaline or earth-alkaline solution, the compound can therefore be isolated as a fourfold alkali metal salt or alkaline-earth metal salt. For example, the sodium salts are advantageous, especially those in which X represents the methoxy group. The free acids of the compounds of formula I are obtained by adding acids, e.g., mineral acids, to a solution of the salts of the compounds of formula I. If $R_1$ and $R_2$ form with N a heterocyclic ring, then this can be, e.g., the piperidino, hexamethyleneimino or morpholino radical, and methyl-substituted or ethylsubstituted derivatives thereof.

The compounds are suitable for the optical brightening of organic materials, especially such materials made from cellulose and from natural or synthetic polyamides. These materials may be in the form of fibers such as cotton, staple fiber, rayon, paper, fleeces, wool and nylon fibers. On account of their resistance to acid, the compounds are particularly suitable for the brightening of paper in the mass, or cotton or nylon from acid baths. Furthermore, they are advantageously used for the brightening of spinning masses, such as polyamide spinning masses. They are applied to cellulose fibers in a long bath, i.e., with a ratio of goods to liquor of 1:10 – 1:50, e.g., with 0.01 – 0.25 g of optical brighteners and 2 g sodium sulphate per liter at a dyeing temperature of 30° – 60°C and with a dyeing time of 15 – 30 minutes. In the case of pad dyeing, for example, an amount of 1 – 10 g of the brightener per liter is used; padding is then performed at room temperature, the material squeezed out to 50 – 100 percent liquid content, and afterwards dried. If the brighteners are applied from a bath containing synthetic resin pre-condensates such as, e.g., methylolhydroxyalkyleneureas, and acid catalysts such as, e.g., hydrochloric acid and oxalic acid, then the brightener concentrations mentioned for the pad-dyeing application are suitable. The fabric thus treated is afterwards subjected to a heat treatment. If the compounds of formula I are incorporated into detergents, then these contain, e.g., 0.05 to 0.5 percent of brightener. The brightening of polyamide fibers is performed, e.g., with 0.02 to 0.16 g of brightener and 1 – 10 g of formic acid per liter, with a ratio of goods to liquor of 1 : 30, at a temperature of 90° – 28°C, and with a treatment duration of 30 minutes.

The compounds of formula I are produced according to the invention by reacting 2 moles of 2,4,6-trichloro-1,3,5-triazine, in the first or second synthesis stage, with one mole of 4,4'-diaminostilbene-2,2'-disulphonic acid, or of an alkali metal salt or alkaline-earth metal salt thereof, and, for the rest, in any desired sequence, with 2 moles of an alkali metal salt or alkaline-earth metal salt of a cyanamide of the formula R'-NH-CN wherein R' denotes hydrogen or an alkyl group having one to four carbon atoms, as well as, optionally, with 2 moles of an alcohol having one to four carbon atoms, phenol, or of an amine of the formula $R_1$ —NH—$R_2$ wherein $R_1$ and $R_2$ have the meanings given above; and, optionally, alkylating the nitrogen of the cyanamide groups, if R' denotes hydrogen, with an alkyl, hydroxyalkyl or aminoalkyl halide.

The reaction with the alcohol, phenol, or with the stated amine, is performed preferably in the presence of an acid-binding agent, e.g., in the excess of the amine used for the reaction, or by the use of alkali alcoholates such as sodium methylate, with the introduction of a methoxy group. If this reaction is not performed, then chlorine remains as substituent X in the desired compound.

The first step of the reaction is carried out preferably at temperatures around −10°C, the second step at 0° −30°C, and the final step at 50° − 100°C. If in the third step the reaction is with an aromatic amine such as aniline, then this reaction is performed preferably in the weakly-acid pH-range. The reaction may be carried out either in purely aqueous medium, or in a mixture of water and organic solvents which are hydrophilic to the reactants. Suitable solvents for this purpose are, in the first place, low-molecular ketones such as acetone or methyl ethyl ketone. The very readily water-soluble final products of formula I are precipitated, in an easily filterable form, from their aqueous solutions preferably by salting out, e.g., with alkali chlorides. Another method of isolating consists in evaporating the reaction solutions in vacuo to dryness. Using this method of isolation, less pure products are obtained.

The temperatures are given in degrees Centigrade in the following examples.

EXAMPLE 1

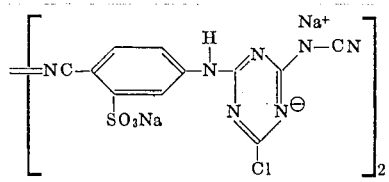

Sodium salt of 4,4'-bis-[4''-cyanamino-6''-chloro-s-triazinyl-(2'')-amino]-stilbene-2,2'-disulphonic acid.

To a suspension cooled to 0° of 36.9 g of cyanuric chloride in 35 g of acetone and 26 g of water are added, in the course of 1 hour, 220 ml of a 16.5 percent solution of the disodium salt of 4,4'-diaminostilbene-2,2'-disulphonic acid. The reaction medium is maintained with 20 percent sodium carbonate solution at a pH-value of 6. The mixture is held for a further half hour at 0°, the precipitated reaction product separated, and afterwards washed with ca. 500 ml of 10 percent sodium chloride solution.

The still moist suction-filter residue is then added at 0° to a solution of 32 g of disodium cyanamide in 600 g of $H_2O$. The pH-value is adjusted to 10.5 with $CO_2$-gas. The mixture is thereupon stirred at 0°− 5° for 16 hours, and the pH-value maintained constant at 10.5 by the addition of 2-n NaOH. The mixture is subsequently heated to 25°, and held at this temperature for 6 hours. After the addition of 250 ml of 25 percent sodium chloride solution, the reaction product of the above given structure is obtained as a light-yellow solid substance, by filtration under suction, in a yield of 90 − 95 percent of the theoretical value. The substance is washed with acetone, and dried at 60°/20 mm.

The compound is suitable for the optical brightening of cellulose material, such as cotton.

EXAMPLE 2

2.1.

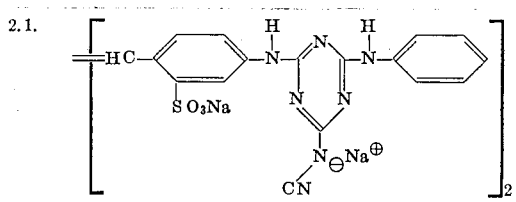

Sodium salt of 4,4' -bis-[4''-phenylamino-6''-cyanamino-s-triazinyl-(2'')-amino]-stilbene-2,2'-disulphonic acid.

The still moist suction-filter residue of the sodium salt of 4,4'-bis-[4''-cyanamino-6''-chloro-s-triazinyl-(2'')-amino]-stilbene-2,2'-disulphonic acid of a charge as described under Example 1 is suspended in 500 ml of water; and to the suspension are then added 28 g of aniline. The mixture is heated for 4 hours to 95°, and a pH-value of 8.5 is thereby maintained. The reaction product is precipitated in the hot state by the addition of NaCl, filtered off, and washed with dilute NaCl-solution. The reaction product is dried in vacuo at 80°/20 mm.

The product is suitable for the optical brightening of cellulose and polyamide material, such as cotton and wool, by the usual methods of application.

If aniline is replaced by equivalent amounts of m-chloroaniline or of p-toluidine, the sodium salts of the following compounds are obtained:
2.2.  4,4'-Bis-[4''-m-chlorophenylamino-6''-cyanamino-s-triazinyl 2'')-amino]-stilbene-2,2'-disulphonic acid, and
2.3.  4,4'-Bis-[4''-p-methylphenylamino-6''-cyanamino-s-triazinyl-(2'')-amino]-stilbene-2,2'-disulphonic acid.

EXAMPLE 3

3.1.

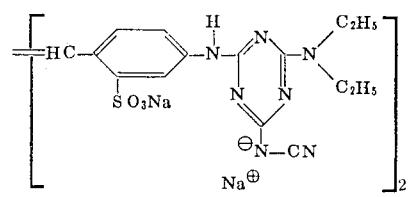

Sodium salt of 4,4'-bis-[4''-diethylamino-6''-cyanamino-s-(2'')-amino]-stilbene-2,2'-disulphonic acid.

The still moist suction-filter residue of the sodium salt of 4,4'-bis-[4''-chloro-6''-cyanamino-s-triazinyl-(2'')-amino]-stilbene-2,2'-disulphonic acid (Example 1) is suspended in 500 ml of water. To the suspension are added 15 g of diethylamine; the mixture is heated for 5 hours to 90°, and a pH-value of 9.5 is thereby maintained by the addition of 10 percent sodium hydroxide solution. After the mixture has been cooled to 50°, sodium chloride is added and, after cooling to 25°, the solid light-yellow reaction product is isolated. The yield is at least 80 percent of the theoretical value.

The product is suitable for the brightening of polyamide and cellulose material, particularly by the acid application process.

By using in the preparation, instead of 15 g of diethylamine, equivalent amounts of morpholine, piperidine, monoethylamine, 2-methoxyethylamine or 3-methoxypropylamine, the corresponding dimorpholino-(3.2.), dipiperidino-(3.3.), bis-monoethylamino-(3.4.), bis-(2-methoxyethylamino-(3.5.) and bis-(3-methoxypropylamino compounds (3.6.) are obtained, which possess similar brightening properties.

If the 15 g of diethylamine are replaced by a solution of ammonia in excess, the corresponding diamino derivative (3.7.), which is suitable too for the brightening of cellulose material, is obtained.

EXAMPLE 4

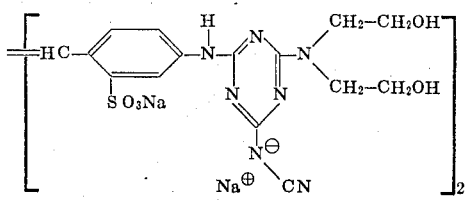

Sodium salt of 4,4'-bis-[4''-bis-(2-hydroxyethylamino)-6''-cyanamino-s-triazinyl-(2'')-amino]-stilbene-2,2'-disulphonic acid.

The still moist suction-filter residue of 4,4'-bis-[4''-cyanamino-6''-chloro-s-triazinyl-(2'')-amino]-stilbene-2,2'disulphonic acid of a charge as described under Example 1 is suspended in 500 ml of water. To the suspension are added 44 g of diethanolamine. The mixture is heated during 1 hour to 70°, and the reaction product, after cooling to 20°, is precipitated by the addition of NaCl. The reaction product is washed with dilute NaCl-solution, and dried in vacuo.

It is suitable for the optical brightening of cellulose material such as cotton.

If in the preparation is used, instead of 44 g of diethanolamine, an equivalent amount of monoethanolamine, then a compound 4.2 is obtained having similar brightening effects.

EXAMPLE 5

5.1.

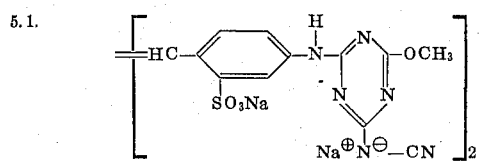

Sodium salt of 4,4'-bis-[4''-methoxy-6''-cyanamino-s-triazinyl-(2'')-amino]-stilbene-2,2'-disulphonic acid.

An amount of 10 g of the sodium salt of 4,4'-bis-[4''-chloro-6''-cyanamino-s-triazinyl-(2'')-amino]-stilbene-2,2'-disulphonic acid is suspended in 400 ml of methanol. To the suspension is then added 1 g of sodium methylate, and the suspension is refluxed for 16 hours. After cooling to 25°, the bulk of the reaction product is isolated by filtration with suction of the precipitated portion. By concentration of the filtrate, a further amount of reaction product can be isolated. The yield is, at a minimum, 85 percent of the theoretical value.

The obtained compound is suitable for the optical brightening of cellulose material, such as cotton and paper in the pulp.

If the stilbene compound used as starting material is suspended in 400 ml of ethanol, and 1 g of sodium ethylate added to the suspension, this then being refluxed as stated above, then instead of the methoxy compound, the ethoxy derivative (5.2.) is obtained; and using isopropyl alcohol and 1 g of sodium isopropylate, the corresponding isopropoxy derivative (5.3.) is obtained, both exhibiting a brightening effect similar to that of 5.1.

EXAMPLE 6

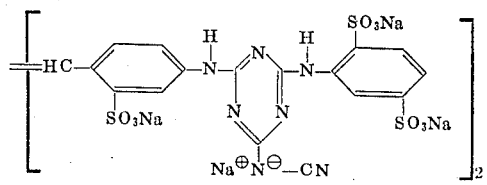

Sodium salt of 4,4'-bis-[4''-(2,5-disulphophenylamino)-6''-cyanamino-s-triazinyl-(2'')-amino]-stilbene-2,2'-disulphonic acid.

An amount of 20 g of the sodium salt of 4,4'-bis-[4''-(2,5-disulphophenylamino-6''-chloro-s-triazinyl-(2'')-amino]-stilbene-2,2'-disulphonic acid, produced by reaction of cyanuric chloride and aniline-2,5-disulphonic acid in aqueous suspension with a pH-value of 1 – 2 and at 0° – 5°, and subsequent reaction of this intermediate product with diaminostilbenedisulphonic acid at 15° – 20° and with a pH-value of 7 – 8, is suspended in 500 ml of water. To the suspension are then added 6 g of disodium cyanamide, whereby a yellow solution is formed. This is refluxed for 16 hours, the pH-value being maintained at ca. 10. The still hot solution is filtered and the filtrate concentrated by evaporation to a volume of 150 ml. Acetone is added to the filtrate, and a solid light-yellow reaction product is isolated. It is dried at 80°/20 mm. The yield is, at a minimum, 90 percent of the theoretical value.

The product is used for the optical brightening of cotton and polyamides, e.g., by the exhaust process.

EXAMPLE 7

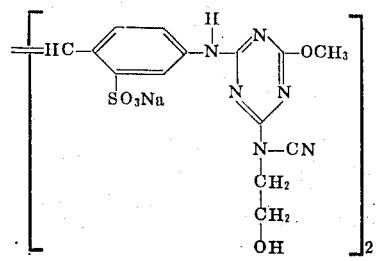

Sodium salt of 4,4'-bis-[4''-methoxy-6''-(N-cyano-2-hydroxyethyl-amine-s-triazinyl-(2'')-amino]-stilbene-2,2'-disulphonic acid.

An amount of 10 g of the disodium salt of 4,4'-bis-[4''-methoxy-6''-cyanamino-s-triazinyl-(2'')-amino]-stilbene-2,2'-disulphonic acid is dissolved in 200 ml of dimethylformamide. To the solution are added 3 g of ethylene chlorohydrin, and the mixture is heated for 16 hours to 70°. The slightly yellowish solution is allowed to cool to 25°, and is filtered off under suction from the small amount of undissolved residue.

The filtrate is concentrated to dryness in a rotary evaporator, and the residue suspended in acetone. The solid, slightly yellowish reaction product is filtered off under suction, and dried. The yield is, at a minimum, 90 percent of the theoretical value.

The product is suitable for the optical brightening of polyamide fibers in an acid bath.

EXAMPLE 8

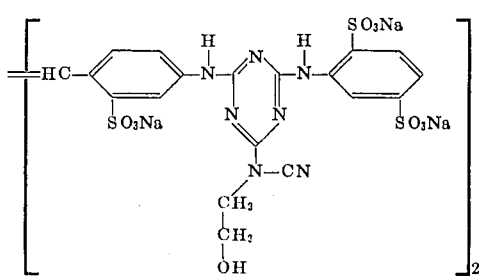

Sodium salt of 4,4'-bis-[4''-(2,5-disulphophenylamino)-6''-(N-cyano-2-hydroxyethylamino)-s-triazinyl-(2'')-amino]-stilbene-2,2'-disulphonic acid.

An amount of 20 g of the sodium salt of 4,4'-bis-[4''-(2,5-disulphophenylamino)-6''-cyanamino-s-triazinyl-(2'')-amino]-stilbene-2,2'-disulphonic acid is dissolved in 200 ml of dimethylformamide. To the solution are added 4 g of ethylenechlorohydrin, and the whole is heated, whilst being stirred, for 16 hours to 70°. After cooling to 25°, the bulk of the reaction product is isolated by filtration under suction of the precipitated yellow solid substance. A further amount of reaction product can be isolated by concentration by evaporation of the filtrate. The yield amounts to 90 percent of the theoretical value.

The obtained product is suitable for the optical brightening of cellulose material, such as cotton.

EXAMPLE 9

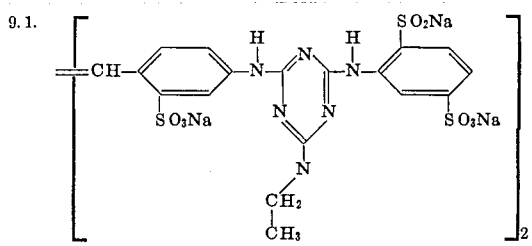

Sodium salt of 4,4'-bis-[4''-(2,5-disulphophenylamino)-6''-(N-cyanethylamino)-s-triazinyl-(2'')-amino]-stilbene-2,2'-disulphonic acid.

An amount of 20 g of the sodium salt of 4,4'-bis-[4''-(2,5-disulphophenylamino)-6''-cyanamino-s-triazinyl-2''-amino]-stilbene-2,2'-disulphonic acid is dissolved in 200 ml of dimethylformamide. To the solution are added 5 g of ethyl bromide, and the mixture is heated, whilst being stirred, for 16 hours to 50°. After cooling to 25°, the dark solution is separated by filtration from the small amount of residue present. The filtrate is concentrated by evaporation to dryness, and the solid residue repeatedly extracted with acetone. An almost colorless reaction product is obtained, whereby the yield is, at a minimum, 85 percent of the theoretical value.

If the 20 g of the sodium salt of 4,4'-bis-[4''-(2,5'-disulphophenylamino)-6''-cyanamino-s-triazinyl-2''-amino]-stilbene-2,2'-disulphonic acid is replaced by an equivalent amount of 4,4'-bis-[4''-methoxy-6''-cyanamino-s- triazinyl-2''-amino]-stilbene, then a brightener 9.2. is obtained having similar properties.

EXAMPLE 10

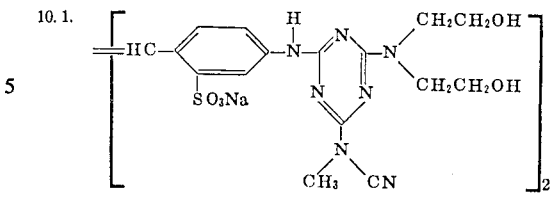

Sodium salt of 4,4'-bis-[4''-bis-(2-hydroxyethyl)-amino-6''-N-methylcyanamino-s-triazinyl-2''-amino]-stilbene-2,2'-disulphonic acid.

The still moist suction-filter residue of the sodium salt of 4,4'-bis-[4''-(2-hydroxyethylamino)-6''-cyanamino-s-triazinyl-(2'')-amino]-stilbene-2,2'-disulphonic acid (4.1.) is dissolved in 750 ml of water. The solution is heated to 50° and 40 g of dimethyl sulphate are added. A pH-value of 9.5 is maintained by addition of dilute NaOH. After 2 hours reaction time, the reaction mixture is allowed to cool to 25°, and the precipitated reaction product filtered off.

The product is used for the brightening of polyamides and cellulose materials, such as polyamide fibers or cotton, by the acid exhaust process.

If, instead of 4,4'-bis-[4''-(2-hydroxyethylamino)-6''-cyanamino-s-triazinyl-(2'')-amino]-stilbene-2,2'-disulphonic acid, an equivalent amount of 4,4'-bis-[4''-(3-sulphophenyl-amino)-6''-cyanamino-s-triazinyl-(2'')-amino]-stilbene-2,2'-disulphonic acid is used, then a compound is obtained having similar properties (10.2.).

EXAMPLE 11

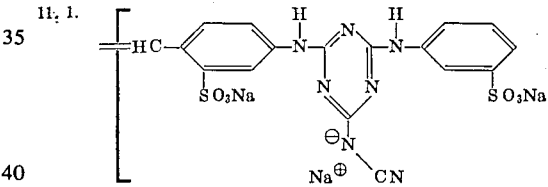

Sodium salt of 4,4'-bis-[4''-m-sulphophenylamino-6''-cyanamino-s-triazinyl-2''-amino]-stilbene-2,2'-disulphonic acid.

The still moist suction-filter residue of the sodium salt of 4,4'-bis-[4''-cyanamino-6''-chloro-s-triazinyl-2''-amino]-stilbene-2,2'-disulphonic acid (Example 1) is suspended in 500 ml of water. To the suspension is then added a neutral solution of 50 g of metanilic acid in 200 ml of water. The mixture is heated to 90°, and is maintained at a pH-value of 6 – 7. After 8 hours under these reaction conditions, the reaction product is precipitated whilst still hot with NaCl. For purification, the separated residue is dissolved in soda-alkaline medium in 1.5 liters of water. It is filtered off from the small amount of undissolved substance, and to the filtrate is again added sodium chloride, whereby the reaction product precipitates. It is filtered off under suction, and dried.

The product is used for the brightening of polyamide fibers from an acid bath.

A product having similar properties (11.2.) is obtained by using, instead of 50 g of metanilic acid, the same amount of sulphanilic acid.

EXAMPLE 12

A solution is produced of the optical brightener 4.1 according to Example 4 by dissolving 1 g of the brightener in 1000 ml of water. An amount of 2 ml of this stock solution is added to 100 ml of water containing 0.2 g of sodium sulphate. This aqueous solution containing the brightener is heated to 40° – 45°; 3 g of pre-bleached cotton fabric are then introduced into the solution, and treated at this temperature for 30 minutes. The fabric is then rinsed for 2 minutes in cold running water, and afterwards dried for 20 minutes at 60°.

The thus treated fabric is brilliantly white.

Similar brightening effects are produced by the brighteners of the compounds 1,2,3.1., 3.2.,4.2., 5.1., 5.2., 5.3. and 10.1. of the corresponding examples.

EXAMPLE 13

To 100 ml of water are added 0.4 g of detergent of the following composition:

| | |
|---|---|
| dodecylbenzenesulphonate | 16% |
| fatty alcohol sulphonate | 4% |
| Na-tripolyphosphate | 35% |
| tetra-Na-pyrophosphate | 7% |
| Mg-silicate (Mg $SiO_3$) | 2% |
| Na-disilicate [$Na_2(SiO_3)_2$] | 7% |
| carboxymethyl cellulose | 1% |
| metal-complex-forming agents | 0.5% |
| sodium sulphate | ca. 25% |
| water | 2.5% |

A solution is produced of the optical brightener 2.1. according to Example 2 by dissolving 1 g of the brightener in 1,000 ml of water. An amount of 2 ml of this stock solution are added to the above described washing solution. This aqueous solution containing the brightener is heated to 60°, and 3 g of pre-bleached cotton fabric are then introduced into the solution. The temperature of the bath is raised within 10 – 15 minutes to 92° and the bath is maintained at this temperature for 30 minutes. The fabric is then rinsed for 2 minutes in cold running water, and afterwards dried for 20 minutes at 60°. The thus treated fabric is brilliantly white.

Similar brightening effects are produced by the compounds 3.2, 3.4.,4.1., 4.2., 10.1., 10.2. of the corresponding examples.

EXAMPLE 14

To 100 ml of water are added 0.2 g of sodium sulphate and 0.2 ml of 40 percent acetic acid. A solution is prepared of the optical brightener 9.1 according to Example 9 by dissolving 1 g of the brightener in 1000 ml of water. An amount of 2 ml of this stock solution is added to the above described solution. This aqueous solution containing the brightener is heated to 40° – 45°; and 3 g of pre-bleached cotton fabric are then introduced into the solution, and treated for 30 minutes at this temperature. The fabric is afterwards rinsed for 2 minutes in cold running water, and subsequently dried for 20 minutes at 60°.

The thus treated fabric has a brilliant white appearance.

Similar effects are obtained with the compounds 3.3., 5.1., 5.2., 5.3., 8 and 9.2. of the corresponding examples.

EXAMPLE 15

To 100 ml of water are added 0.2 g of sodium sulphate and 0.2 g of aluminum sulphate. A solution is prepared of the optical brightener 3.3. of Example 3 by dissolving 1 g of the brightener in 1,000 ml of water. An amount of 2 ml of this stock solution is added to the above described solution. This aqueous liquor containing the brightener is heated to 40° – 45°; and 3 g of pre-bleached cotton fabric are introduced into the liquor, and treated at this temperature for 30 minutes. The fabric is then rinsed in cold running water for 2 minutes, and dried for 20 minutes at 60°.

The thus treated fabric has a brilliant white appearance.

Similar effects are obtained with the compounds 5.1., 5.2., 5.3., 8 and 9.1 of the corresponding examples.

EXAMPLE 16

A stock solution is prepared of the optical brightener 2.1 according to Example 2 by dissolving 1 g of the brightener in 100 ml of water. An amount of 20 ml of this solution is diluted with 80 ml of water. A pre-bleached cotton fabric is padded with this liquor (squeezing effect 60 – 70 percent, roller pressure 15 kg/cm, speed 3 m/min.).

Immediately after padding, the fabric is dried at 130° for 30 seconds.

The thus treated fabric is brightened brilliantly white.

Similar results are obtained with the compounds 3.1., 4.1. and 10.1. of the corresponding examples.

EXAMPLE 17

A stock solution is produced of the optical brightener 10.1. according to Example 10 by dissolving 1 g of the brightener in 100 ml of water. An amount of 20 ml of this solution is diluted with 80 ml of water. A pre-bleached cotton fabric is padded with this solution (squeezing effect 60 - 70 percent, roller pressure 15 kg/cm, speed 3 m/min.).

After padding, the fabric is rolled up, packed into polyethylene sheets and, after 1 hour standing at room temperature, dried at 130° for 30 seconds.

The thus treated fabric is brightened brilliantly white.

Similar effects are obtained with the compounds 2.1., 3.1., 3.4., 4.1, and 4.2. of the corresponding examples.

EXAMPLE 18

To 110 ml of water are added 0.36 g of a stabilized hydrosulphite.

A solution is produced of the optical brightener 4.2. by dissolving 1 g of the brightener in 1,000 ml of water. An amount of 7.5 ml of this stock solution is added to the above described solution. This aqueous solution containing the brightener is heated to 40°; and 3 g of pre-bleached wool fabric or yarn are introduced into the solution. The temperature is raised within 10 – 15 minutes to 60°, and the bath is left at this temperature for 60 minutes. The fabric is then rinsed for 2 minutes in cold running water, and afterwards dried for 20 minutes at 60°. The thus treated fabric is brightened brilliantly white.

Similar effects are obtained with compounds 2.1., 3.1., 3.2., 3.4., 10.1. of the corresponding examples.

EXAMPLE 19

A stock solution is prepared of the optical brightener 10.1. of Example 10 by dissolving 1 g of the brightener in 100 ml of water.

A bleached cotton fabric is impregnated on a padding machine with a finishing liquor at 20° containing per liter the following constituents:

| | |
|---|---|
| 52 g of dimethylolethyleneurea | 100% |
| 23 g of hexamethylolmelamine | 100% |
| 200 g of brightener solution | 1:100 |
| 18 g of magnesium chloride cryst. | |

The impregnated material is squeezed out to a liquor absorption of 60 – 70 percent relative to the dry weight of the fabric, and dried at 60°. Condensation is performed at 140° for 5 minutes.

The treated fabric is brightened brilliantly white.

Similar effects are obtained with the compounds 2 and 3.1 of the corresponding examples.

EXAMPLE 20

To 100 ml of water are added 0.12 ml of 85 percent formic acid.

A solution is produced of the optical brightener 10.2. by dissolving 1 g of the brightener in 1,000 ml of water. An amount of 3 ml of this stock solution is added to the above described solution. This aqueous liquor containing the brightener is heated to 60°; to the liquor are then added 3 g of polyamide fabric. The temperature is raised within 10 – 15 minutes to 92° – 95°, and the fabric is left at this temperature for 30 minutes. The fabric is afterwards rinsed for 2 minutes in cold running water, and subsequently dried for 20 minutes at 60°.

The thus treated material is brightened brilliantly white.

Similar brightening effects are produced by the compounds 2., 3.1., 3.2., 3.4. 4.2., 5.1., 5.2., 5.3., 7., 9.1., 10.1., 11.1 and 11.2 of the corresponding examples.

Example 21

400 Parts of caprolactam, 40 parts of water, 0.4 parts of the brightener 3.4. according to Example 3, and 1.6 parts of titanium dioxide (Anatas) are mixed together, and heated to 70° until the mass has liquified. The liquid mixture is transferred to a pressure vessel made of stainless steel, and heated within 1 hour, with the exclusion of oxygen, to a temperature of 250°, whereby a pressure of 10 – 15 atmospheres is produced. After this period of time, the water is distilled off, and the polymer mass is subsequently maintained for 3 hours at 250°, without pressure, until complete degassing has occurred. The mass thereby attains a viscosity which enables the polymerisate to be extruded in the form of tapes or filaments through a nozzle provided in the base of the pressure vessel. The solidified polyamide is separated from the monomer constituents by extraction with water. The polyamide tapes or fibers obtained by this process are distinguished by a very high degree of whiteness. The brightening agent is fixed fast to washing, and the polyamide fibers, which are improved in appearance, a good fastness to light.

Similar effects are produced by the compound d 4.2. of Example 4.

EXAMPLE 22

An amount of 50 g of an aqueous suspension of 5 g of dry bleached cellulose is mixed with 96 ml of water and 4 ml of a 10 percent aluminum sulphate solution; this approximately corresponds to an industrially used and processed water still containing acid. The pH-value of the mixture is 4.2, and it is well stirred at room temperature for about 5 minutes.

To this paper pulp is added a solution of 7 mg of the brightener 5.1. according to Example 5 in 3.5 ml of water, and the whole vigorously stirred for 15 minutes. Into the mixture are then stirred 1.5 ml of a 5 percent aqueous colophony suspension having a dry content of approximately 41 percent of colophony (85 percent of free resin, 15 percent of saponified resin) and 1 percent of maleic acid diethyl ester, corresponding to 1.5 percent of colophony calculated on the dry weight of the fiber. After 5 minutes stirring, 1.5 ml of a 10 percent aqueous aluminum sulphate solution are added, and the pulp stirred for a further 5 minutes, attaining thereby a pH-value of about 4.1. It is thereupon diluted with mains water to 1,000 ml, whereupon sheets are poured, pressed, dried and cut. These sheets have a pure white, brilliant appearance.

What we claim is:

1. Compound of the formula I:

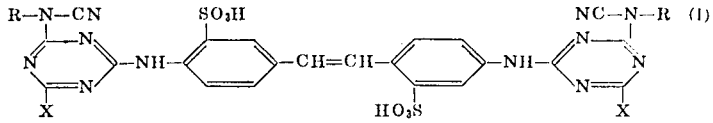

wherein
R represents hydrogen, an alkyl group having one to four carbon atoms, a hydroxyalkyl or aminoalkyl group having two to four carbon atoms,
X X represents chlorine, the radical bound by way of the oxygen of an alcohol having one to four carbon atoms, phenol or the radical

in which $R_1$ stands for hydrogen, an alkyl group having one to four carbon atoms, a hydroxyalkyl group having two to four carbon atoms, an alkoxyalkyl group having three to eight carbon atoms whereby the oxygen atom and the nitrogen atom are not bounded to the same carbon atom, or a phenyl group optionally substituted by one to two chlorine atoms, alkyl groups having one to four carbon atoms, or sulphonic acid groups, $R_2$ stands for hydrogen or an alkyl group having one to four carbon atoms or a hydroxyalkyl group having two to four carbon atoms or $R_1$ and $R_2$ together represent the radical of piperidino, hexamethyleneimino or morpholino or methylsubstituted or ethylsubstituted radicals thereof, or alkali metal salts thereof.

2. Compound according to claim 1 wherein R represents hydrogen and X represents the methoxy group.

3. A compound according to claim 1 which is the sodium salt of 4,4'-bis-[4''-cyanamino-6''-chloro-s-triazinyl-(2'')-amino]-stilbene-2,2'-disulphonic acid.

4. A compound according to claim 1 which is the sodium salt of 4,4'-bis[-4''-phenylamino-6''-cyanamino-s-triazinyl-(2''')-amino]-stilbene-2,2'-disulphonic acid.

5. A compound according to claim 1 which is the sodium salt of 4,4'-bis-[4''-bis-(2-hydroxyethylamino)-6''-cyanamino-s-triazinyl-(2'')-amino]-stilbene-2,2'-disulphonic acid.

6. A compound according to claim 1 which is the sodium salt of 4,4'-bis-[4''-methoxy-6''-cyanoamino-s-triazinyl-(2'')-amino]-stilbene-2,2'-disulphonic acid.

7. A compound according to claim 1 which is the sodium salt of 4,4'-bis-[4''-m-sulphophenylamino-6''-cyanamino-s-triazinyl-2''-amino]-stilbene-2,2'-disulphonic acid.

* * * * *